(12) United States Patent
Wang et al.

(10) Patent No.: US 6,175,667 B1
(45) Date of Patent: Jan. 16, 2001

(54) HIGH-SPEED POLARIZATION-INSENSITIVE ELECTRO-OPTIC MODULATOR

(75) Inventors: Feiling Wang, Medford; Yingyin Zou, Burlington; Paul Melman, Newton; Hua Jiang, Mansfield, all of MA (US)

(73) Assignee: NZ Applied Technologies Corporation, Woburn, MA (US)

( * ) Notice: Under 35 U.S.C. 154(b), the term of this patent shall be extended for 0 days.

(21) Appl. No.: 09/157,999

(22) Filed: Sep. 22, 1998

Related U.S. Application Data

(60) Provisional application No. 60/059,475, filed on Sep. 22, 1997.

(51) Int. Cl.[7] .............................. G02F 1/035; G02F 1/03
(52) U.S. Cl. .................................. 385/3; 385/16; 385/18; 385/34; 359/245; 359/247
(58) Field of Search .................................. 385/1–3, 8, 9, 385/16, 18, 24, 34; 359/246, 247, 250, 245, 117, 128, 131, 254; 349/196

(56) References Cited

U.S. PATENT DOCUMENTS

| | | | |
|---|---|---|---|
| 4,474,435 | 10/1984 | Carlsen et al. | 350/381 |
| 4,504,121 | 3/1985 | Carlsen et al. | 350/385 |
| 4,636,786 | 1/1987 | Haertling | 340/783 |
| 4,746,191 | 5/1988 | Kawakami et al. | 350/96.29 |
| 4,789,228 | * 12/1988 | Le Pesant et al. | 385/16 |
| 4,919,522 | 4/1990 | Nelson | 350/389 |
| 4,990,943 | 2/1991 | Phillips | 350/392 |
| 5,031,235 | 7/1991 | Raskin et al. | 455/612 |
| 5,050,954 | 9/1991 | Gardner et al. | 385/16 |
| 5,090,824 | 2/1992 | Nelson et al. | 385/22 |
| 5,185,675 | 2/1993 | Banks | 359/181 |
| 5,276,747 | 1/1994 | Pan | 385/34 |
| 5,305,136 | 4/1994 | Smith | 359/247 |
| 5,477,350 | 12/1995 | Riza et al. | 359/39 |
| 5,508,840 | 4/1996 | Vogel et al. | 359/291 |
| 5,706,371 | 1/1998 | Pan | 385/11 |
| 5,724,165 | 3/1998 | Wu | 359/117 |
| 5,727,109 | 3/1998 | Pan | 385/140 |
| 5,734,763 | 3/1998 | Chang | 385/11 |
| 5,877,876 | * 3/1999 | Birdwell | 359/39 |

OTHER PUBLICATIONS

Higashina et al., "High Speed Optical TIR Switches Usning Thin–Film Waveguides on Sapphire," Japanese Journal of Applied Physics, vol. 24 (1985) Supplement 24–2, pp. 284–286.

Keigo Iizuka, Engineering Optics, Springer–Verlag, New York (1985), pp. 435–437.

* cited by examiner

*Primary Examiner*—Hemang Sanghavi
(74) *Attorney, Agent, or Firm*—Hamilton, Brook, Smith & Reynolds, P.C.

(57) ABSTRACT

There is provided a device for use with fiber-optic cables for polarization insensitive amplitude modulation of light comprising a planar electro-optic layer with a reflective conductive mirror electrode on one side and a pair of transparent conductive electrodes on the other. The transparent conductive electrodes have a small separation along a straight line. A GRIN lens has one end in optical contact with the transparent conductive electrodes with its axis located over the line separating the electrodes. An input optical fiber and an output optical fiber are placed in optical contact with the other end of the lens at points which are symmetrically displaced from the axis of the lens. Light coming from input fiber is collimated by the GRIN lens and directed to the transparent electrodes, through the electro-optic layer and to the mirror from which it is reflected and refocused by the GRIN lens onto the output fiber. Applying a voltage between any of the transparent electrodes and the reflecting electrode changes the optical path length for half the beam so that when it is refocused on the output fiber, the two halves interfere constructively of destructively, depending on the change in path length. In one version, the electro-optic layer is a PLZT ceramic plate, while in others, it is a thick or thin film. In still other versions, two or more electro-optic layers are used in series in order to reduce the voltage required for the same optical path length change. A means to eliminate residual sensitivity to polarization sensitivity is described.

22 Claims, 3 Drawing Sheets

HIGH-SPEED POLARIZATION-INSENSITIVE ELECTRO-OPTIC MODULATOR

CROSS REFERENCE TO RELATED APPLICATIONS

This application claims priority from a provisional application serial No. 60/059,475 filed Sep. 22, 1997.

STATEMENT OF GOVERNMENTAL INTEREST

This invention was made with Government support under contract no. DAAH01-95-C-R205 awarded by the Department of Defense. The Government has certain rights in this invention.

BACKGROUND OF THE INVENTION

1. Technical Field

The present invention relates to optical amplitude modulators for use with fiber-optic cable waveguides. More particularly, the modulator uses an electro-optic material to controllably change the optical phase of two parts of a transmitted and reflected light beam, irrespective of polarization, causing interference and, hence, modulation when the two parts recombine.

2. Background

Great efforts have been made to obtain polarization-insensitive optical devices in fiber-optic communication systems, which include modulators, switches, attenuators, etc. Most of these need a set of polarization pre-process devices, such as TE-TM mode converters, polarization selective couplers, or polarization rotators, to adjust the polarization of the light beams to obtain polarization insensitive devices. For example, one type describes a polarization-insensitive switch which comprises polarization-dependent components advantageously arranged. The polarization insensitive switch is achieved by splitting incoming arbitrarily polarized light waves into two paths, a light wave with a TE radiation component and one with a TM radiation component. The light wave with the TE component is then converted to a light wave with a TM component. Both light waves with TM components are then switched in a polarization-dependent photonic switching device. The initial polarization state is recovered by converting the appropriate switched TM component to one having a TE component. The converted TE component is then combined with the remaining switched TM component in a polarization combiner. These may be difficult to keep aligned.

Another example uses a liquid crystal switch/attenuator using two birefringent polarizers. The first polarizer separates an arbitrarily polarized optical signal into two polarization modes, an ordinary ray and an extraordinary ray. The liquid crystal controls the rotation of the optical signals with respect to the optical axis of the first polarizer with respect to the optical axis of the second polarizer. The second polarizer analyzes the optical signals and sends them to a combiner. The main drawback to this device is that liquid crystal response times may not be fast enough for some telecommunications applications.

Another type of polarization-insensitive optical device is taken from the species of optical reflection modulators with movable mirror surfaces. In this, an end of an input fiber is near the focal point of a lens so that emerging light expands and is collimated to impinge on two mirrors, each covering about half of the expanded beam. By moving the mirrors with respect to each other by a fraction of the light wavelength, the path length in the two halves can be changed so that when the reflected light is imagined onto an output fiber, the two halves of the beam can be made to interfere constructively or destructively. Although the design is elegantly simple, since it uses piezoelectric or electrostatic mirror drivers, it is unlikely to reach the kind of speeds desirable in fiber-optic communication systems. Another problem is that, since the mirrors must be free to move, the structure must be constructed with an air gap so that maintaining alignment with the reflecting surface may be difficult.

SUMMARY OF THE INVENTION

Accordingly, the main objects of the invention are to produce a polarization insensitive solid-state optical amplitude modulator (attenuator) for use in fiber-optic systems which can operate at high modulation frequencies. Further objectives are to make one that is rugged in design, easy to keep in alignment, and cost effective.

In one version, a fiber-optic cable used as the input is located on one side of a lens designed to collimating light from the input and focus any back-reflections to a point equi-distant from its optical axis as the input (termed a "conjugate point") where the output fiber-optic cable is located. Two planar optical phase retarders (which may be formed from or on a single plate) are placed on the side of the collimator/focuser opposite the input/output side covering the entire collimated beam from the input fiber, but having each phase retarder cover substantially half the beam. Generally, this means that the phase retarders will be separated by a linear gap which is located on the optical axis of the collimator/focuser. The phase retarders are made with an electro-optic material covered with separate transparent electrodes on the side facing the collimator and conducting reflector electrodes on the side away.

With no voltage applied to the phase retarder electrodes, light from the input beam will be collimated, travel through the phase retarder, be reflected back through the phase retarder, and focused onto the end of the output fiber, undiminished in amplitude. However, when a voltage is applied to one of the phase retarders, the half of the beam traversing it will, to a greater or lesser extent, be out of phase with the other half of the beam as they impinge on the output fiber. They will then destructively interfere with each other and reduce the amount of light that enters the output fiber. The reduction becomes total when the optical phase difference is 180°. If the phase retarder is made with an electro-optic layer that is optically isotropic for directions perpendicular to the beam travel, i.e., in the plane of the layer, then the effects will be insensitive to the polarization of the light. The highest modulation speed depends on the electro-optic material. For lead lanthanum zirconate titanate (PLZT), the speed is in the nanosecond range. Losses are caused primarily by reflections at various interfaces, but there is no fundamental reason why these can't be low with the proper use of anti-reflection coatings. For PLZT, except for the small effects of fringing fields, the change in optical phase is insensitive to polarization because it satisfies the above condition.

In the above version, two passes were made through the phase retarder and the resulting phase lags are additive. In order to reduce the control voltage further, more phase retarders can be used. In this case, a transparent electrode would be substituted for the reflective one in the first pair and a similar pair of the phase retarders would be located next to the first pair opposite the collimator/focuser. The second pair would use a reflective electrode as the first pair had in the first version. Depending on the electro-optic material, the layers may share common electrodes or may require transparent insulating layer between them. In both versions separate mirrors could be used.

When the phase retarder pairs are made using a single layer of electro-optic material such as a ceramic plate, there is a fringing field along the gap between the transparent electrodes in the material under the gap. This field has components which are parallel to the layer and primarily perpendicular to the gap. Since some part of the beam goes through the gap and the effects on this part will now depend on the direction of polarization, the device will not be ideal. However, the problem can be substantially eliminated by placing a quarter-wave plate between the phase retarders and the mirror. After traveling through the quarter-wave plate and back out, all polarizations will be rotated 90°, i.e., if the original polarization were perpendicular to the gap on its way to the quarter-wave plat, it would be parallel on the way out and conversely. Thus both polarizations will be affected by the phase retarders the same, either on the way through or the way back.

Use of a GRIN lens as the collimator/focuser makes it possible to cement input and output fibers to one end and the phase retarders to the other, resulting in a rugged compact unit which should stay in alignment. These and all other required components (for the preferred versions) are commercially available, relatively low in cost, and the process to make the electrodes and mirrors are straightforward and not expensive.

DETAILED DESCRIPTION OF THE INVENTION

Figure 1:
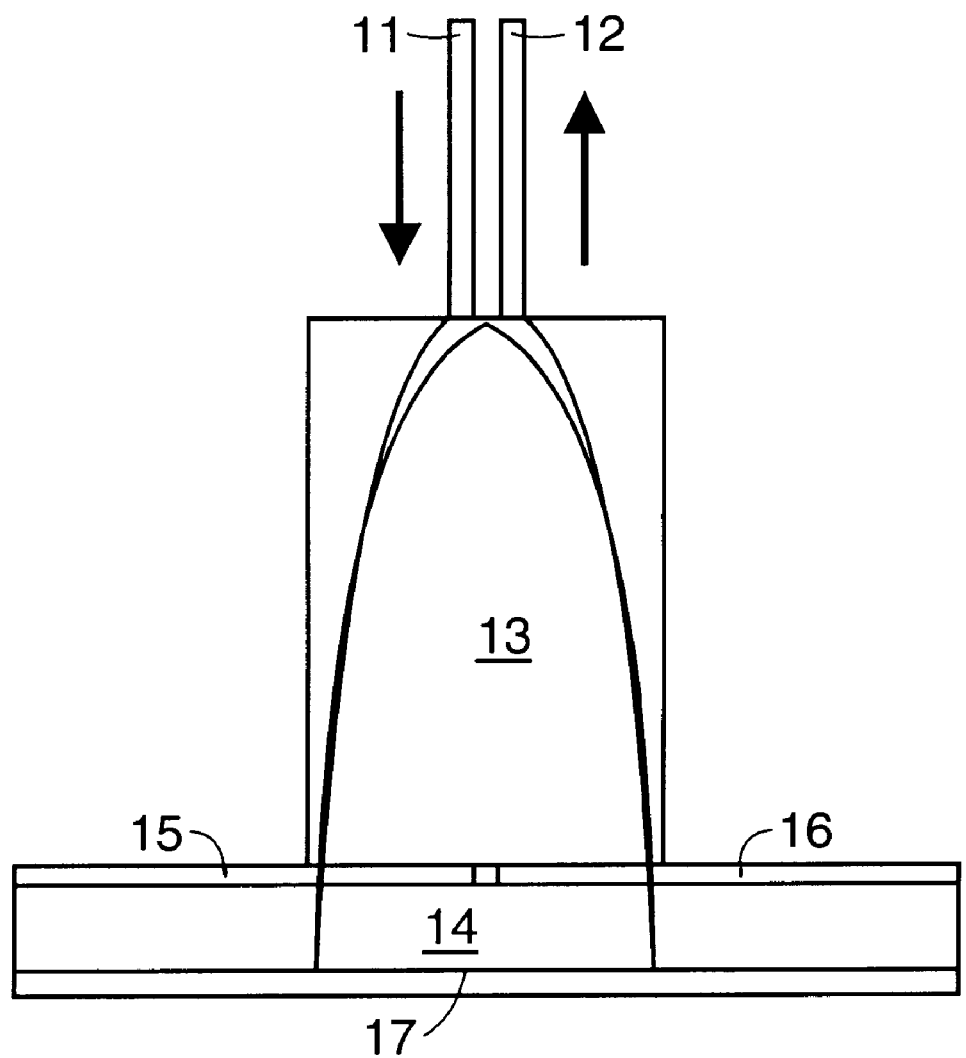
FIG. 1 illustrates a high-speed polarization-insensitive electro-optic modulator.

A preferred embodiment of the device is illustrated in cross-section in FIG. 1. This shows an input optical fiber 11 contacting one end of an approximately 0.25 pitch GRIN (GRaded INdex) or rod-type lens 13 at a position away from the central axis of the lens, and an output fiber 12 contacting the lens at a point symmetrical to the input fiber. Usually, the fibers will be attached to the lens with a UV-curing index-matching adhesive that are common in the field of fiber-optics. The GRIN lens 13 is in optical contact with an electro-optic layer 14. The electro-optic layer has, on the side in contact with the lens, a first and second conducting transparent electrode 15 and 16 and, on the opposite side, a conductive reflector 17. The transparent electrodes (shown larger than necessary) cover the entire beam area except for a small separation (shown exaggerated) along one diameter of the round lens. If the lens is ideal, any diameter is equivalent but, as shown, a diameter orthogonal to a line between the two fiber contacts may be preferred. Usually, the lens will also be adhered to the transparent electrodes with UV-curing adhesive, but index matching will require a different index than that used with the fibers. The electrodes 15 and 16 are connected to independent sources (not shown) of voltages between those electrodes and the conductive reflector 17.

The invention uses the advantageous properties of GRIN lenses. The GRIN lens 13 collimates the light which emerges at a divergence angle (shown much exaggerated) from the input fiber 11 and causes it be directed toward the conductive reflector 17. The light traverses the electro-optic layer 14, is reflected, traverses the layer a second time, and is directed and focused by the lens on the output fiber 12. If no voltage is applied, the light will enter the output fiber unattenuated.

However, if a voltage is applied between one of the electrodes 15 or 16 and the conductive reflector 17 and a suitable electro-optic material is used for the layer 14, the optical path length will change for the half of the light beam traversing the material between that electrode and the reflector 17. If the optical path length changes by the equivalent of half a wavelength, for example, that half of the beam will be 180° out of phase with the other half. When the two halves are reconverged at the output fiber, they will destructively interfere. The amount of interference depends on the size of the output fiber, but for single-mode fibers with a 10 $\mu$m core and 1.5 $\mu$m light, for example, the interference is nearly total. More precisely, the single mode fiber won't allow any of these two different modes to propagate into it.

When the relative phase shift is not 180°, the interference will not be total but vary as $((1+\cos\theta)/2)^{1/2}$, where $\theta$ is the difference in optical phase. Thus, modulation, i.e., variable attenuation, can be achieved by controlling the amount of optical path difference through the application of different voltages.

A suitable electro-optic material is one which, on application of a voltage which creates an electric field in the material along the direction of propagation of light, changes either its index of refraction for light propagating in that direction or its thickness. In order to be polarization-insensitive, the change must be the same for light in any polarization state. This condition can be met by materials which have at most one optical axis with or without the application of an electric field, further provided, that such axis is oriented parallel to the direction of propagation. Here, this means that any optical axis should be normal to the planar layer.

In general, assuming a layer of thickness, D, and index of refraction n, on entering the plate, the velocity of the light and its wavelength, $\lambda$, will be reduced by 1/n. On exiting the plate, the waves will have gone through an optical path length $\phi=nD$ and undergone $\phi/\lambda$ cycles. Unless this quantity is an integer, N, i.e., $\phi=N\lambda$, the waves coming out will lag in phase by the amount $\theta$ (deg)=360×($\phi/\lambda$ modulo N). Thus, if the quantities n or D, or both can be controlled, so can the phase lag.

In general, for any material with an applied voltage, V, one can write Equation 1: $\Delta\phi=n\Delta D+D\Delta n=n\gamma V^2/D-0.5n^3RV^2/D+ndV-0.5n^3rV$ The four terms on the right represent the electrostrictive, quadratic electro-optic (Kerr), piezoelectric, and linear electro-optic (Pockell's) effects with coefficients $\gamma$, R, d and r, respectively. All materials exhibit the first two effects which depend quadratically on V to a greater or lesser extent. There also exist 20 classes of piezoelectric crystals with no center of symmetry which also exhibit the later two effects which depend linearly on V. Note that, for ferroelectric and possibly other materials, the R coefficient is negative so that the first two effects are additive. Also, d and r may be positive or negative, but they have opposite signs in some materials so that the later two effects add to each other also.

The four coefficients are in general complex tensors taking into account absorption and the direction of the externally caused electric field in the material with respect to the direction of propagation of the light. However, the invention can be understood by assuming no absorption and ignoring the field and light directions. In the embodiments illustrated herein, the applied electric field will, ideally, be parallel to the light, but some materials have non-zero coefficients when the electric field is perpendicular. The invention merely requires that an effect exists no matter what the mechanism.

Material selection involves, among other considerations, selecting those with the highest combination of coefficients. Lead lanthanum zirconate titanate (PLZT) of composition $Pb_xLa_{1-x}(Zr_yTi_z)_{1-x/4}$ (x=9, y=65, z=35) does not exhibit the linear effects (d=r=0) but has high quadratic coefficients, λ and R. It is commercially available as hot pressed ceramic plates, 250 μm thick, from Aura Ceramics (New Hope, Minn.). Other possibilities include PLZT thin films on a suitable transparent substrate, see Higashino et al, *High Speed Optical TIR Switches Using PLZT Thin-Film Waveguides on Sapphire*, Jap. J. Appl. Phys., vol. 24, Supp. 24-2, pp. 284–286 (1985), incorporated herein by reference. Alternately, PLZT thick films have been made, K. K. Li et al, *An Automatic Dip Coating Process for Dielectric Thin and Thick Films*, Integrated Ferroelectrics, vol 3, pp. 81–91 (1993), incorporated herein by reference. Besides PLZT, a number of other materials are well known to have usefully high electro-optic coefficients. However, PLZT is preferred because it should be among the lowest in required operating voltage and be less expensive. Also, the electro-optic response time of a typical oxide electro-optic material, such as PLZT, is in the sub-nanosecond range, C. Bao, et al., CLEO '95, Baltimore, Md., May 21–26, 1995, incorporated herein by reference.

With an exactly 0.25 pitch GRIN lens 13, light from the input fiber is collimated as much as possible at the other end. The divergence on entering the electro-optic layer 14 depends on the input fiber core size, the initial divergence and the type of GRIN lens selected. Single-mode 10 μm core fibers operating with 1.5 μm light have divergences of about 6°. This angle is reduced by the same factor that the beam is expanded. GRIN lenses are commercially available which can expand the beam to about 550 μm so that the divergence on exiting the lens is reduced to about 0.1°. If the light then makes a round trip through the electro-optic layer, the beam size on re-entering the GRIN lens will be about 2 μm bigger. The annulus, consisting of the extra beam area, will not be focused on the output fiber and will be lost. However, it represents only 1% of the area and is pessimistic because beam energy from the input fiber is concentrated at small divergence angles. One solution is to use thinner plates or films. Another source of loss is the gap between the conducting transparent electrodes 15 and 16. If this were 1 μm, it would represent 0.2% of the area, but much is in the central region. Nonetheless, in some situations, it may be desirable to accept the small losses and use smaller beam expansions in order to reduce the required area of the electro-optic layer and, hence, capacitance, so that high speed operation is easier to achieve.

Instead of a hot-pressed ceramic, the equivalent of FIG. 1 could be obtained by depositing electrodes 15 and 16 on the GRIN lens 13, followed by formation of a thin or thick-film electro-optic layer 14, followed by deposition of the conductive reflector 17. However, the GRIN lens may not survive some process and using a transparent sapphire substrate may yield better electro-optic films. In this case, the substrate must come between either the GRIN lens 13 and the electro-optic layer 14 or the electro-optic layer and a separate reflector. Form the above, it follows that the substrate should be as thin as possible.

Figure 2:
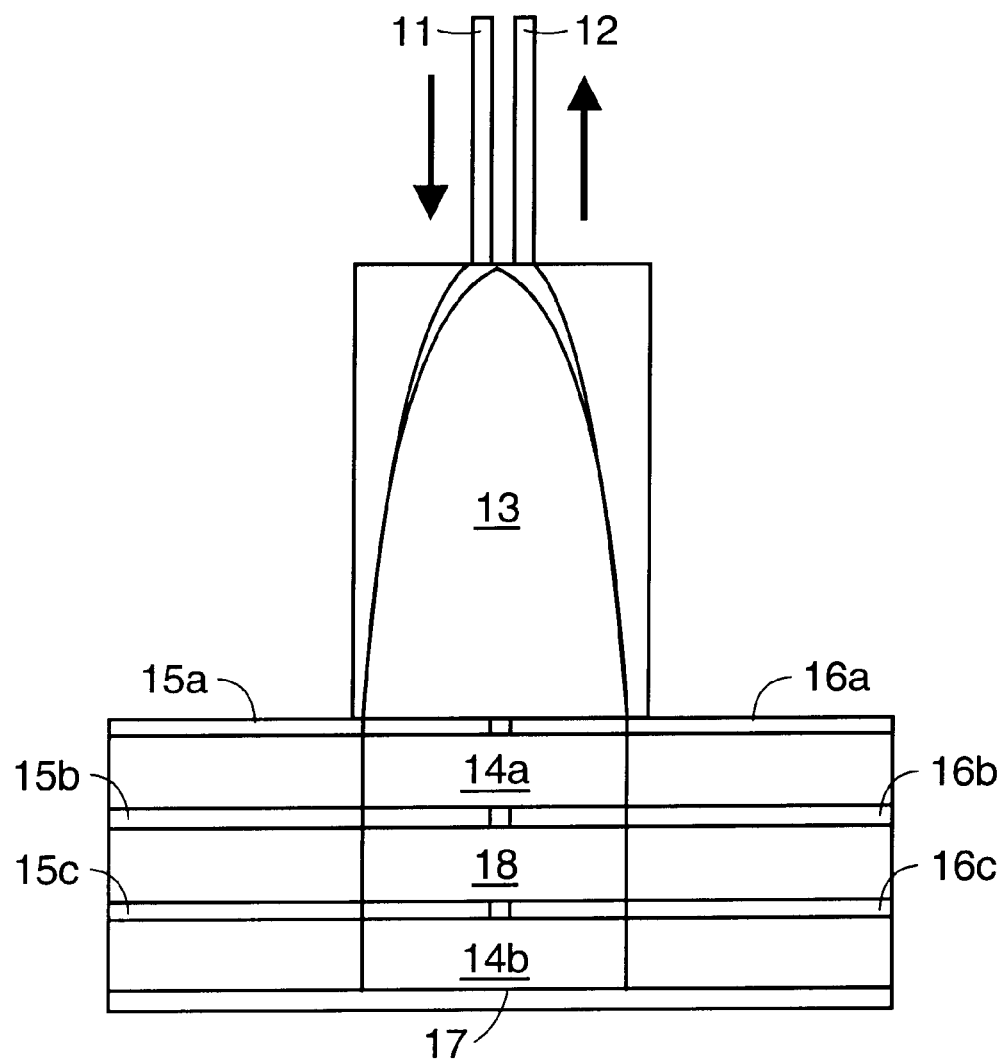
FIG. 2 illustrates the use of two or more electro-optic layers.

FIG. 2 illustrates the use of two electro-optic layers to increase the optical phase change for a given voltage. The two electro-optic layers 14a and 14b are on both sides of a substrate 18 with transparent electrodes 15a, 15b, 15c, 16a, 16b, and 16c. It may be desirable to produce a multi-layer stack of alternating layers of transparent conducting electrodes and thin electro-optic layers in order to achieve adequate optical phase shift with low voltages. For electro-optic materials which exhibit quadratic effects, an electrode can be used as both the top of one layer and the bottom of another with alternating voltage polarities across the electro-optic layer. This is because voltages of equal amplitude but alternating signs may be applied with the same effect on each layer, independent of sign. If linear materials are used, in order to keep the overall voltage low, it would be necessary to use separate electrodes insulated from each other by a transparent dielectric. Note that, by using sapphire for the substrate 18 and simply leaving out the electrodes 15c and 16c and the electro-optic layer 14b and depositing a reflector on the substrate, one has a single layer device. The electrodes 15b and 16b should be contiguous for best results.

The conductive reflector 17 could be made from a dielectric mirror with very high reflectivity or a variety of metals. However, gold is easily deposited by vacuum evaporation and has a very high reflectivity at the 1.3 μm and 1.5 μm wavelengths commonly used in fiber-optic communication systems. The transparent electrodes 15 and 16 could also be made from a thin metal coating but indium tin oxide (ITO) films are easily deposited by sputtering in vacuum. When high frequency operation is desired, it is important that the electrodes have a low enough resistance so as not to limit the speed with which the capacitance of the electro-optic layer can be charged. The spacing between electrodes should be as small as possible, but not so small that voltage breakdown occurs between them. In this regard, it may be desirable to split ceramic plates and etch a break in deposited electro-optic films.

Figure 3:
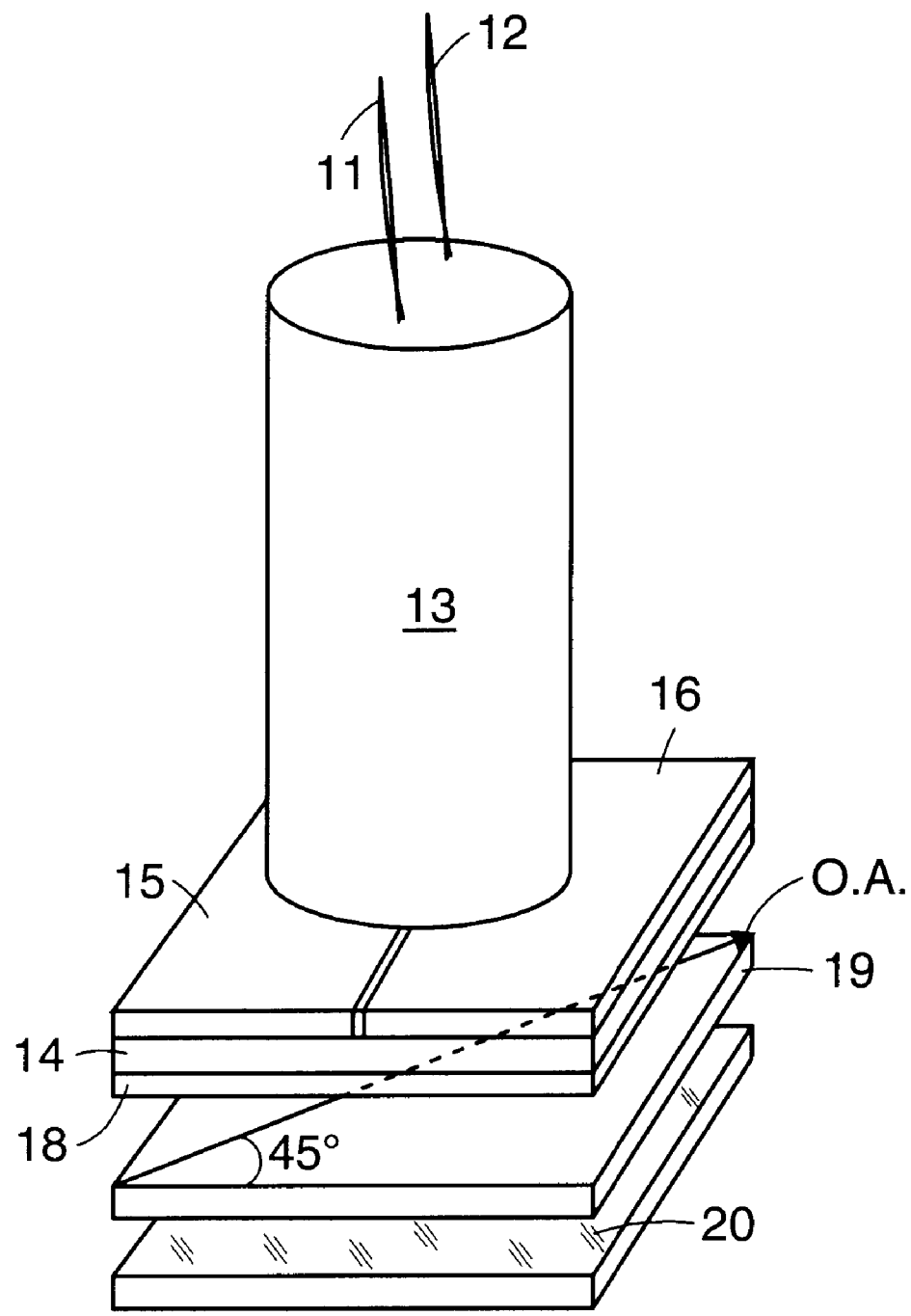
FIG. 3 illustrates the use of a quarter-wave late in FIG. 1 to eliminate polarization-sensitivity.

The embodiment illustrated in FIG. 2 is less than ideal in certain situations. When the electro-optic plate 14 is thick in order to obtain adequate phase retardation, a substantial fringing field may arise when the control voltage is applied between, e.g,, electrode 15 and 17. This appears at the edge of electrode 15 adjacent to electrode 16. In addition to a longitudinal component normal to the electro-optic plate 14, there will be a non-uniform transverse component parallel to the plate primarily in a direction perpendicular to length of the gap between electrodes 15 and 16. This field will also change the index of refraction with effects depending on whether the light is polarized parallel or perpendicular to it. As a result, the device will be polarization-sensitive to some extent. This effect can be eliminated using the embodiment illustrated in FIG. 3. As a modification of the embodiment illustrated in FIG. 2, the reflector electrode 17 is changed to a transparent conductive electrode 18, a quarter-wave plate 19 is placed adjacent (shown spaced apart for illustration purposes) the electrode 18, and reflector 20 is placed adjacent the quarter-wave plate. The reflector may be comprised of a self-supporting structure or be deposited on the quarter-wave plate.

As shown, the optical axis of the quarter-wave plate 19 is in the plane of the electro-optic plate 14 and makes a 45° angle with respect to gap between electrodes 15 and 16 with the following effect. For light exiting from a first pass through the electro-optic plate 14 and electrode 18 which is polarized in a direction perpendicular to the gap and parallel to the primary transverse field, after one pass through the quarter-wave plate 19, it will be circularly polarized.

However, after reflection by the reflector 20 and a second pass through the quarter wave plate, the will now be perpendicular to the primary transverse electric field. Similarly, light originally perpendicular to the transverse electric field on the first pass will be parallel on the second pass through the electro-optic plate. As a result, both polarizations of incoming light from fiber 1 will have made one parallel pass and one perpendicular pass with respect to the primary transverse field. The same applies with respect to a transverse field parallel to the gap. Therefore, the optical phase lag of the two original polarizations will have been affected equally and the amount of interference at output fiber 2 will not be affected by the transverse fields. To the extent that this approach is effective, it would relax the restriction on the requirement for using uniaxial crystals.

The embodiment illustrated in FIG. 2 supposed using thinner electro-optic layers in order to reduce the control voltage. However, the same approach can be used if the fringing fields in that embodiment are not insignificant.

While the preferred embodiments have been sufficiently described to enable one skilled in the art to make and use them, it should be appreciated that other obvious alternatives, modifications, or substantial equivalents will be apparent to those in the field of electro-optics, which equivalents are intended to be include herein, the only limitations being the claims.

What is claimed is:

1. A device for modulating the intensity of light transmitted from an input fiber-optic cable to an output fiber-optic cable comprising:
   a collimator/focuser having an input/output end; and
   first and second planar optical phase retarders having substantially equal areas disposed adjacent an end distal the input/output end and on either side of a diameter of said collimator/focuser, said first and second electro-optic phase retarders each comprising an electro-optic layer having a transparent electrode on a side adjacent said collimator/focuser and a conducting reflector electrode on the side opposite.

2. The device of claim 1 wherein said electro-optic layer of said phase retarder is comprised of a solid state material selected to provide a change in optical path length in a direction normal to said layer when a voltage is applied.

3. The device of claim 2 wherein said solid state material has no more than one optical axis and said axis is normal to the plane of the electro-optic layer.

4. The device of claim 2 wherein said electro-optic layer is comprised of an oxide.

5. The device of claim 4 wherein said oxide is PLZT.

6. The device of claim 5 wherein said PLZT has the composition $Pb_xLa_{1-x}(Zr_yTi_z)_{(1-x/4)}$ and where x=9, y=35, and z=65.

7. The device of claim 5 wherein said PLZT is in the form of a hot pressed ceramic plate.

8. The device of claim 5 wherein said PLZT is a deposited film.

9. The device of claim 1 wherein said collimator/focuser comprises a GRIN lens having a selected pitch.

10. The device of claim 1 wherein said collimator/focuser comprises a GRIN lens having a selected pitch and said optical phase retarder is a hot-pressed PLZT ceramic plate.

11. A device for modulating the intensity of light transmitted from an input fiber-optic cable to an output fiber-optic cable with substantially no polarization-sensitivity comprising a collimator/focuser having an input/output end and;
   first and second planar optical phase retarders having substantially equal areas disposed adjacent an end distal the input/output end and on either side of a diameter of said collimator/focuser, said first and second electro-optic phase retarders each comprising an electro-optic layer having a transparent electrode on a side adjacent said collimator/focuser and a transparent conducting reflector electrode on the side opposite; and
   a quarter-wave plate adjacent said phase retarders having its optical axis in a plane parallel to the plane of said electro-optic layers at an angle of 45° to said diameter of said collimator/focuser; and
   a reflector adjacent said quarter-wave plate on the side opposite said phase retarders.

12. The device of claim 11 wherein said electro-optic layer of said phase retarder is comprised of a solid state material selected to provide a change in optical path length in a direction normal to said layer when a voltage is applied.

13. The device of claim 12 wherein said solid state material has no more than one optical axis and said axis is normal to the plane of the electro-optic layer.

14. The device of claim 12 wherein said electro-optic layer is comprised of an oxide.

15. The device of claim 14 wherein said oxide is PLZT.

16. The device of claim 15 wherein said PLZT has the composition $Pb_xLa_{(1-x)}(Zr_yTi_z)_{(1-x/4)}$ and where x=9, y=35, and x=65.

17. The device of claim 15 wherein said PLZT is in the form of a hot pressed ceramic plate.

18. The device of claim 15 wherein said PLZT is a deposited film.

19. The device of claim 11 wherein said collimator/focuser comprises a GRIN lens having a selected pitch.

20. The device of claim 11 wherein said collimator/focuser comprises a GRIN lens having a selected pitch and said optical phase retarder is a hot-pressed PLZT ceramic plate.

21. A device for modulating the intensity of light transmitted from an input fiber-optic cable to an output fiber-optic cable having reduced voltage requirements comprising;
   a collimator/focuser having an input/output end;
   a pair first and second planar optical phase retarders having substantially equal areas disposed adjacent an end distal the input/output end and on either side of a diameter of said collimator/focuser, said first and second electro-optic phase retarders each comprising an electro-optic layer having a transparent electrode on a side adjacent said collimator/focuser and a transparent electrode on the side opposite;
   at least one additional pair of planar optical phase retarders having substantially equal areas disposed adjacent other phase retarder pairs on either side of said diameter of said collimator/focuser, said first and second electro-optic phase retarders each comprising an electro-optic layer having a transparent electrode on a side adjacent said collimator/focuser and a transparent conducting on the side opposite, the most distal phase retarder pair having a conducing reflector electrode.

22. A method for modulating the intensity of light transmitted from an input fiber-optic cable to an output fiber-optic cable comprising the steps of:
   a) collimating light from the input fiber to form a beam;
   b) dividing the beam into a first and second area with substantially equal intensities;
   c) inducing an optical phase lag to the light in said first beam area using a solid-state electro-optic phase retarder with an applied voltage;
   d) reflecting the first beam back through said solid-state phase retarder and inducing an additional optical phase lag with an applied voltage; and
   e) focusing the beam onto said output fiber.

* * * * *

UNITED STATES PATENT AND TRADEMARK OFFICE
Certificate

Patent No. 6,175,667 B1

Patented: January 16, 2001

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Feiling Wang, Medford, MA; Yingyin Zou, Burlington, MA; Paul Memman, Newton, MA; Hua Jiang, Mansfield, MA; and Jing Zhao, Winchester, MA.

Signed and Sealed this Second Day of July 2002.

RODNEY BOVERNICK
*Supervisory Patent Examiner*
Art Unit 2800

UNITED STATES PATENT AND TRADEMARK OFFICE
Certificate

Patent No. 6,175,667                                            Patented: January 16, 2001

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Feiling Wang, Medford, MA; Yingyin Zou, Burlington, MA; Paul Melman, Newton, MA; Hua Jiang, Mansfield, MA; and Jing Zhao, Winchester, MA.

This Certificate supersedes Certificate issued July 2, 2002.

Signed and Sealed this Thirteenth Day of August, 2002.

*RODNEY BOVERNICK*
*Supervisory Patent Examiner*
Art Unit 2800